(12) United States Patent (10) Patent No.: US 7,906,603 B2
McDaniel et al. (45) Date of Patent: Mar. 15, 2011

(54) POLYMERS HAVING BROAD MOLECULAR WEIGHT DISTRIBUTIONS AND METHODS OF MAKING THE SAME

(75) Inventors: Max P. McDaniel, Bartlesville, OK (US); Elizabeth A. Benham, Spring, TX (US); Steven J. Secora, Bartlesville, OK (US); Michael D. Jensen, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 12/779,816

(22) Filed: May 13, 2010

(65) Prior Publication Data

US 2010/0222537 A1 Sep. 2, 2010

Related U.S. Application Data

(62) Division of application No. 11/929,448, filed on Oct. 30, 2007, now Pat. No. 7,745,557, which is a division of application No. 10/829,842, filed on Apr. 22, 2004, now Pat. No. 7,307,133.

(51) Int. Cl.
*C08F 210/16* (2006.01)
*C08F 210/02* (2006.01)
(52) U.S. Cl. .................. 526/348.2; 526/106; 526/348
(58) Field of Classification Search .............. 526/106, 526/348.2, 352
See application file for complete search history.

(56) References Cited

U.S. PATENT DOCUMENTS

| | | | |
|---|---|---|---|
| 2,825,721 A | 3/1958 | Hogan et al. | |
| 3,071,493 A | 1/1963 | Whaley et al. | |
| 3,119,569 A | 1/1964 | Baricordi | |
| 3,152,157 A | 10/1964 | Shapiro et al. | |
| 3,248,179 A | 4/1966 | Norwood | |
| 3,622,521 A | 11/1971 | Hogan et al. | |
| 3,625,864 A | 12/1971 | Horvath | |
| 3,887,494 A | 6/1975 | Dietz | |
| 3,900,457 A | 8/1975 | Witt | |
| 3,947,433 A | 3/1976 | Witt | |
| 4,015,059 A | 3/1977 | Karol | |
| 4,053,436 A | 10/1977 | Hogan et al. | |
| 4,081,407 A | 3/1978 | Short et al. | |
| 4,151,122 A | 4/1979 | McDaniel et al. | |
| 4,152,503 A | 5/1979 | Short et al. | |
| 4,177,162 A | 12/1979 | McDaniel et al. | |
| 4,182,815 A | 1/1980 | McDaniel et al. | |
| 4,247,421 A | 1/1981 | McDaniel et al. | |
| 4,248,735 A | 2/1981 | McDaniel et al. | |
| 4,277,587 A | 7/1981 | McDaniel et al. | |
| 4,294,724 A | 10/1981 | McDaniel | |
| 4,296,001 A | 10/1981 | Hawley | |
| 4,297,460 A | 10/1981 | McDaniel et al. | |
| 4,345,055 A | 8/1982 | Hawley | |
| 4,364,839 A | 12/1982 | McDaniel et al. | |
| 4,364,841 A | 12/1982 | McDaniel et al. | |
| 4,364,842 A | 12/1982 | McDaniel et al. | |
| 4,364,854 A | 12/1982 | McDaniel et al. | |
| 4,364,855 A | 12/1982 | McDaniel et al. | |
| 4,382,022 A | 5/1983 | McDaniel | |
| 4,392,990 A | 7/1983 | Witt | |
| 4,397,765 A | 8/1983 | McDaniel | |
| 4,397,769 A | 8/1983 | McDaniel et al. | |
| 4,402,864 A | 9/1983 | McDaniel | |
| 4,405,501 A | 9/1983 | Witt | |
| 4,405,768 A | 9/1983 | McDaniel | |
| 4,424,320 A | 1/1984 | McDaniel | |
| 4,424,341 A | 1/1984 | Hanson et al. | |
| 4,436,883 A | 3/1984 | Witt | |
| 4,436,886 A | 3/1984 | Tsai et al. | |
| 4,444,962 A | 4/1984 | McDaniel et al. | |
| 4,444,964 A | 4/1984 | McDaniel et al. | |
| 4,444,965 A | 4/1984 | McDaniel et al. | |
| 4,444,966 A | 4/1984 | McDaniel | |
| 4,460,756 A | 7/1984 | McDaniel et al. | |
| 4,501,855 A | 2/1985 | Noren | |
| 4,504,638 A | 3/1985 | McDaniel et al. | |
| 4,589,957 A | 5/1986 | Sherk et al. | |
| 4,613,484 A | 9/1986 | Ayres et al. | |
| 4,737,280 A | 4/1988 | Hanson | |
| 4,900,704 A | 2/1990 | McDaniel et al. | |

(Continued)

FOREIGN PATENT DOCUMENTS

EP 1146079 A1 10/2001

(Continued)

OTHER PUBLICATIONS

Bird, R. Byron, et al., "Dynamics of polymeric liquids. vol. 1: Fluid Mechanics," 2nd Edition, 1987, pp. xiii to xviii, 171-172, 1 cover page, and 1 publication page, A Wiley-Interscience Publication, John Wiley & Sons, Inc., USA.

Dockter, Terri A., "Cp cocatalysts for chromium catalysts," PI-210481 Search Report, Jul. 24, 2003, 35 pgs.

Foreign communication from a related counterpart application—International Search Report, PCT/US2005/009669, Jan. 30, 2006, 7 pages.

(Continued)

*Primary Examiner* — Caixia Lu
(74) *Attorney, Agent, or Firm* — Conley Rose, P.C.; Rodney B. Carroll; Cheryl L. Huseman

(57) ABSTRACT

Methods of polymerizing at least one olefin include contacting the olefin with a catalyst comprising chromium and with a cocatalyst comprising a non-transition metal cyclopentadienyl (Cp) compound. The polymerization may be performed in the presence of hydrogen. Using the cocatalyst in conjunction with the catalyst increases several properties, such as the high load melt index (HLMI), the $M_w$, and the $M_N$, of the polymers produced by this polymerization method. Polymer compositions produced by such methods have various unique properties, including a PDI greater than about 30. Additional embodiments include articles of manufacture or end use articles formed from such polymer compositions.

22 Claims, 3 Drawing Sheets

U.S. PATENT DOCUMENTS

| | | |
|---|---|---|
| 4,981,831 A | 1/1991 | Knudsen et al. |
| 5,183,792 A | 2/1993 | Wang et al. |
| 5,276,115 A | 1/1994 | Bohmer et al. |
| 5,418,200 A | 5/1995 | Carney et al. |
| 5,473,027 A | 12/1995 | Batchelor et al. |
| 5,565,175 A | 10/1996 | Hottovy et al. |
| 5,575,979 A | 11/1996 | Hanson |
| 5,597,892 A | 1/1997 | Hanson |
| 5,714,424 A | 2/1998 | Warthen et al. |
| 5,914,375 A | 6/1999 | Tsai et al. |
| 6,072,054 A | 6/2000 | Abd-El-Aziz et al. |
| 6,103,658 A | 8/2000 | Mackenzie et al. |
| 6,174,981 B1 | 1/2001 | Bergmeister et al. |
| 6,239,235 B1 | 5/2001 | Hottovy et al. |
| 6,465,586 B2 | 10/2002 | McDaniel et al. |
| 6,525,148 B1 | 2/2003 | McDaniel et al. |
| 6,531,553 B1 | 3/2003 | Shamshoum et al. |
| 6,531,565 B2 | 3/2003 | Kellum et al. |
| 6,583,241 B1 | 6/2003 | Beach et al. |
| 6,617,403 B2 | 9/2003 | Sukhadia et al. |
| 6,642,324 B2 | 11/2003 | Bergmeister et al. |
| 6,657,023 B2 | 12/2003 | Bergmeister et al. |
| 6,787,608 B2 | 9/2004 | VanDun et al. |
| 6,867,278 B2 | 3/2005 | McDaniel et al. |
| 6,977,235 B2 | 12/2005 | McDaniel et al. |
| 7,307,133 B2 | 12/2007 | McDaniel et al. |
| 7,384,885 B2 | 6/2008 | Roger et al. |
| 7,416,686 B2 | 8/2008 | Äärilä et al. |
| 2008/0051545 A1 | 2/2008 | McDaniel et al. |

FOREIGN PATENT DOCUMENTS

| | | |
|---|---|---|
| JP | 51120413 | 10/1976 |
| WO | 9623006 A1 | 8/1996 |
| WO | 2005108439 A2 | 11/2005 |
| WO | 2005108439 A3 | 11/2005 |

OTHER PUBLICATIONS

Heinemann, Oliver, et al., "Bis(indenyl)chromium is a dimer," Organometallics, 1996, pp. 5462-5463, vol. 15, No. 26, American Chemical Society.

Hieber, C. A., et al., "Shear-rate-dependence modeling of polymer melt viscosity," Sibley School of Mechanical and Aerospace Engineering, Cornell University, Ithaca, New York, Jul. 1992, pp. 931-938, vol. 32, No. 14, Polymer Engineering and Science.

Hieber, C. A., et al., "Some correlations involving the shear viscosity of polystyrene melts," Sibley School of Mechanical & Aerospace Engineering, Cornell University, Ithaca, New York, 1989, pp. 321-332, vol. 28, No. 4, Rheologica Acta.

Liang, Yuanfeng, "Constrained geometry chromium catalysts for olefin polymerization," Organometallics, 1996, pp. 5284-5286, vol. 15, No. 25, American Chemical Society.

POLYMERS HAVING BROAD MOLECULAR WEIGHT DISTRIBUTIONS AND METHODS OF MAKING THE SAME

CROSS-REFERENCE TO RELATED APPLICATIONS

This is a Divisional Application of U.S. patent application Ser. No. 11/929,448 filed Oct. 30, 2007, published as US 2008-0051545A1, which is a divisional application of U.S. patent application Ser. No. 10/829,842, issued as U.S. Pat. No. 7,307,133 on Dec. 11, 2007, all entitled "Polymers Having Broad Molecular Weight Distributions and Methods of Making the Same." The present application is related to U.S. Pat. No. 6,977,235, issued on Dec. 20, 2005 and entitled "Catalyst System Comprising a Chromium Catalyst and a Non-Transition Metal Cyclopentadienyl Cocatalyst." Each of the patents and patent application is hereby incorporated by reference herein in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention generally relates to polymers, and more particularly to polymers having relatively broad molecular weight distributions and methods of making the same using a chromium-based catalyst and a non-transition metal cyclopentadienyl cocatalyst.

BACKGROUND OF THE INVENTION

The production of polyolefins using chromium-based catalysts is well known in the art. Various supports have been employed for such chromium-based catalysts. Silica supports have primarily been used due to their ability to form highly active polymerization catalysts. Other examples of supports that have been used for such chromium-based catalysts include alumina and aluminophosphates. Supported chromium-based catalysts were initially employed in solution polymerization processes. However, slurry polymerization soon became known as the more economical route to many commercial grades of polyolefins using such catalysts.

A polyolefin exhibits various physical, and in particular, mechanical properties that are highly affected by its molecular weight distribution (MWD). The molecular weight distribution can be determined by means of a curve obtained by gel permeation chromatography (GPC). It can be described by a parameter known as the polydispersity index (PDI), which indicates the breadth of the molecular weight distribution and is equivalent to the weight-average molecular weight of a polymer divided by the number-average molecular weight of the polymer (i.e., $M_W/M_N$). A broadening in the molecular weight distribution of a polyolefin tends to improve the flow of the polyolefin when it is being processed at high rates of shear.

The polymerization of olefins using chromium-based catalysts is often performed in the presence of hydrogen to produce polyolefins having relatively low molecular weights. However, although hydrogen can be used to regulate the molecular weight, the breadth of the molecular weight distribution of a polyolefin tends to be limited by the choice of catalyst. A need therefore exists to broaden the molecular weight distributions of polyolefins produced using chromium-based catalysts.

SUMMARY OF THE INVENTION

Methods of polymerizing at least one olefin include contacting the olefin with a catalyst comprising chromium and with a cocatalyst comprising a non-transition metal cyclopentadienyl (Cp) compound. The polymerization may be performed in the presence of hydrogen. Using the cocatalyst in conjunction with the catalyst increases several properties, such as the high load melt index (HLMI), the $M_W$, and the $M_N$, of the polymers produced by this polymerization method.

Polymer compositions produced by such methods have various unique properties. In one embodiment, the polymer compositions have a $M_W$ greater than about 600,000 g/mol and a HLMI in a range of from about 0.01 g/10 min to about 10 g/10 min. In another embodiment, the polymer compositions have a $M_W$ greater than about 400,000 g/mol and a zero shear viscosity ($E_o$) less than about $10^8$ Pa·s. In yet another embodiment, the polymer compositions have a rheological breadth parameter greater than about 0.15 and a PDI greater than about 30. Additional embodiments include polymer compositions having other properties, and articles of manufacture or end use articles formed from the foregoing polymer compositions.

DETAILED DESCRIPTION OF THE INVENTION

Figure 1:
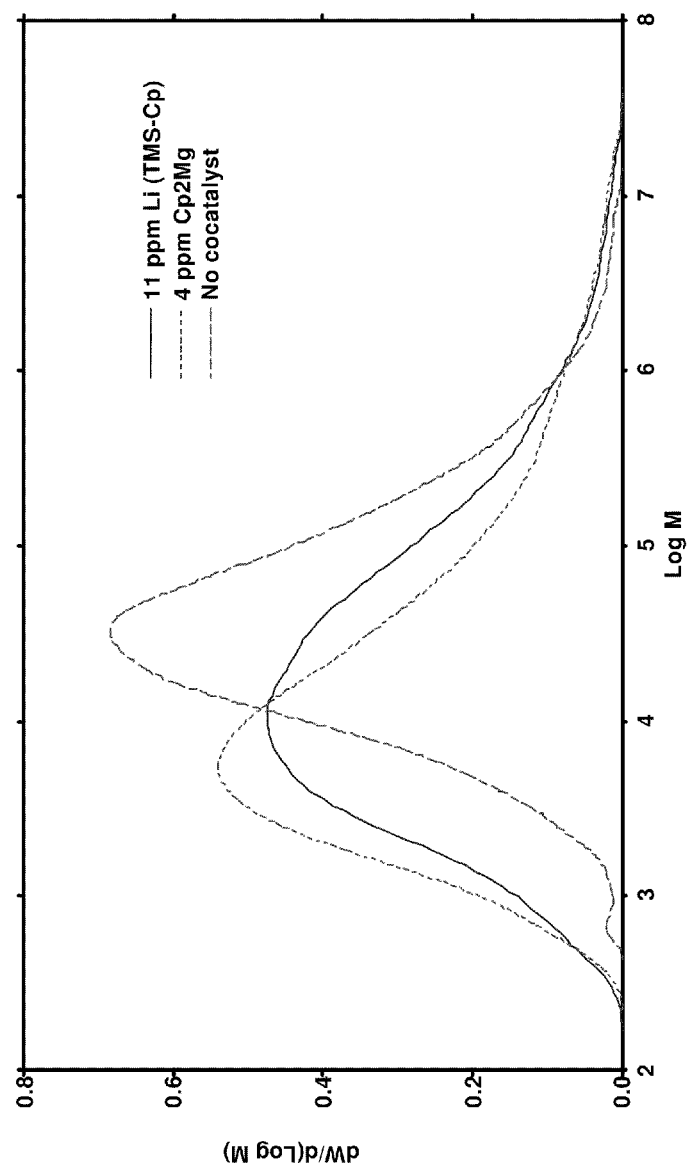
FIG. 1 depicts a graph illustrating the molecular weight distributions of polyethylene resins formed using a chromium-based catalyst and different non-transition metal cyclopentadienyl cocatalysts and of a polyethylene resin formed using a chromium-based catalyst but no cocatalyst.

A catalyst system suitable for use in polymerizing olefins includes at least one chromium-based catalyst and at least one non-transition metal cyclopentadienyl (Cp) compound as a cocatalyst. A mole ratio of the non-transition metal Cp compound to the chromium in the catalyst system may range from about 0.001 to about 20, from about 0.001 to about 10, from about 0.003 to about 20, from about 0.01 to about 3, or from about 0.02 to about 2. The non-transition metal Cp compound typically constitutes from about 0.01 to about 50 ppm by weight of the reaction zone contents, alternatively from about 0.1 to about 20 ppm, or alternatively from about 0.1 to about 10 ppm by weight of the contents of a reaction zone in which the catalyst system is used for polymerization.

The non-transition metal Cp cocatalyst contains a non-transition metal bonded to a Cp group. Examples of suitable non-transition metals include a Group I metal such as lithium (Li) and sodium (Na), a Group II metal such as magnesium (Mg), and a Group III metal such as aluminum. Examples of suitable Cp groups include cyclopentadienyl, a fluorenyl group, and an indenyl group. The Cp group may be substituted or unsubstituted. For example, the Cp group may be substituted with an alkyl group, an aryl group, an alkylaryl group, an alkoxy group, an aryloxy group, an alkylsilyl group, or combinations thereof. In an embodiment, the metal Cp cocatalyst is cyclopentadienyl lithium (CpLi), dicyclopentadienyl magnesium ($Cp_2Mg$), a lithium aluminum cyclopentadienyl trialkyl, or combinations thereof. If the metal is a divalent or trivalent metal, other anions may accompany the Cp group, such as halides, alkoxides, or organic radicals. For example, the metal Cp cocatalyst may also be cyclopentadienyl magnesium ethoxide ($CpMgOC_2H_5$), indenyl aluminum dibutyl ($IndAl(C_4H_9)_2$) or fluorenyl ethyl boron chloride ($FluBClC_2H_5$). The metal Cp cocatalyst may also be a complex salt of two metals such as lithium aluminum cyclopentadienyl triethyl ($LiAlCp(C_2H_5)_3$).

The chromium-based catalyst includes chromium on a support that serves as a carrier for the chromium. The support may primarily include an inorganic oxide such as silica, alumina, aluminophosphates, and mixtures thereof. In an embodiment, the support contains greater than about 50 percent (%) silica, alternatively greater than about 80% silica, by weight of the support. The support may further include additional components that do not adversely affect the catalyst system, such as titania, zirconia, alumina, boria, thoria, magnesia, and mixtures thereof. The support has a specific surface area and a specific pore volume effective to provide for an active catalyst. A Quantachrome Autosorb-6 Nitrogen Pore Size Distribution Instrument, which is commercially available from the Quantachrome Corporation of Syosset, N.Y., may be used to determine the specific surface area (hereinafter "surface area") and specific pore volume (hereinafter "pore volume") of the support. The surface area of the support may range from about 100 square meters per gram ($m^2/g$) to about 1,000 $m^2/g$, alternatively from about 200 $m^2/g$ to about 800 $m^2/g$, or from about 250 $m^2/g$ to about 700 $m^2/g$. Further, the pore volume of the support, i.e., an indicator of the amount of liquid it can absorb, may range from about 0.5 cubic centimeters per gram (cc/g) to about 3.5 cc/g or alternatively from about 0.8 cc/g to about 3 cc/g.

The chromium may be loaded on the support using any method known in the art. In one embodiment, a coprecipitated cogel of chromium and of one or more support components is made. As used herein, cogel refers to the product resulting from the gelation of two or more components. In another embodiment, the support is impregnated with an aqueous solution containing a water-soluble chromium compound. Examples of water-soluble chromium compounds include chromium oxide, chromium trioxide, chromium acetate, chromium nitrate, or combinations thereof. In yet another embodiment, the support is impregnated with a hydrocarbon solution in which a chromium compound is dissolved after removing water from the support by, e.g., spray dying or azeotropically drying it. Examples of hydrocarbon soluble chromium compounds include tertiary butyl chromate, a diarene chromium compound, biscyclopentadienyl chromium(II), chromium acetylacetonate, or combinations thereof. The amount of chromium present in the ensuing catalyst may range from about 0.01% to about 10% by weight of the catalyst, alternatively from about 0.2% to about 5%, or from about 0.5% to about 2%.

In an embodiment, chromium-based catalyst grades 963, 964, 969, or combinations thereof may be obtained from any commercial source such as the Grace Davison catalysts of W.R. Grace & Company of Columbia, Md. Especially suitable are those catalysts comprising chromium oxide supported by a high porosity silica-titania as are described in U.S. Pat. Nos. 3,887,494 and 3,119,569, both of which are incorporated by reference herein in their entirety. By way of example, the support may be produced by simultaneous gellation of silica, titania, and chromia. Such gellation may be performed by contacting an alkali metal silicate such as sodium silicate with an acid solution containing a titanium salt such as a sulfuric acid titanyl sulfate solution containing chromium, thereby forming a cogel, also known as a hydrogel. After gellation, the cogel may be aged at a pH of from about 7 to about 8 for several hours at 80° C. It may then be azeotropically dried in an organic solvent such as hexanol to form a xerogel. The titanium content of this support may range from about 1% to about 10% by weight of the catalyst. The surface area of this support is typically about 550 $m^2/g$, and the pore volume of the support is typically in the range of from about 2.2 cc/g to about 2.5 cc/g.

Additional disclosure regarding chromium-based catalysts supported by silica/titania can be found in the following patents: U.S. Pat. Nos. 4,405,501 and 4,436,886 which relate to the aging process; U.S. Pat. Nos. 4,436,883 and 4,392,990 which relate to $N_2$ calcination; U.S. Pat. Nos. 4,081,407 and 4,152,503 which relate to azeotropic drying using hexanol; U.S. Pat. No. 4,981,831; U.S. Pat. Nos. 4,294,724, 4,382,022, 4,402,864, and 4,405,768, and 4,424,320 which relate to titanation; and U.S. Pat. Nos. 2,825,721, 4,382,022, 4,402, 864, 4,405,768, 3,622,521, 3,625,864 which relate to silica-titania, all of the foregoing patents being incorporated by reference herein in their entirety. Aluminophosphate supported catalysts are described in U.S. Pat. Nos. 4,364,842, 4,444,965, 4,364,855, 4,504,638, 4,364,854, 4,444,964, 4,444,962, each of which is incorporated by reference herein in its entirety. Phosphated alumina supported catalysts are described U.S. Pat. Nos. 4,444,966, 4,397,765, and 4,900, 704, each of which is incorporated by reference herein in its entirety.

The chromium-based catalyst may be activated using any known technique after introducing the chromium to the support. In one embodiment, the catalyst is activated via calcination by heating it in an oxidizing environment. For example, the support may be heated in the presence of air at a temperature in the range of from about 400° C. to about 1,000° C., alternatively from about 600° C. to about 900° C. Optionally, the calcination may be followed by a reduction step. The reduction step may be performed by, for example, heating the support in the presence of carbon monoxide (CO) at a temperature in the range of from about 200° C. to about 800° C. In another embodiment, the catalyst is activated via a reduction and reoxidation process. Suitable reduction and reoxidation processes are disclosed in U.S. Pat. Nos. 4,151, 122, 4,177,162, 4,247,421, 4,248,735, 4,297,460, 4,397,769, 4,460,756, 4,182,815, 4,277,587, each of which is incorporated by reference herein in its entirety.

In an embodiment, the non-transition metal Cp cocatalyst is co-supported with the chromium-based catalyst. The metal Cp cocatalyst is loaded onto the support after activating it. The Cp cocatalyst may be combined with the support by, for example, impregnating the already activated chromium-based catalyst with an organic (preferably hydrocarbon) solution comprising the metal Cp cocatalyst. The resulting Cr/metal Cp catalyst may then be fed to a polymerization reactor. In another embodiment, the activated chromium-based catalyst and the non-transition metal Cp are separately fed to a polymerization zone. In yet another embodiment, the Cr catalyst and Cp compound can both be continuously fed into a contacting vessel where they react for a period of from about 1 minute to about 10 hours, and from there the contacted ingredients are fed into the polymerization zone. The two feeds can thus be accurately and continuously controlled during the polymerization to determine the correct molar Cp/Cr ratio which in turn controls polymer properties. In this way adjustments to the catalyst-cocatalyst recipe can be made as the polymers are produced.

Polymer compositions may be formed by polymerizing at least one monomer in the presence of the foregoing catalyst system comprising a chromium-based catalyst and a non-transition metal Cp cocatalyst. Examples of suitable monomers include unsaturated hydrocarbons having from 2 to 20 carbon atoms such as ethylene, propylene, 1-butene, 1-pentene, 1-hexene, 3-methyl-1-butene, 4-methyl-1-pentene, 1-heptene, 1-octene, 1-nonene, 1-decene, and mixtures thereof. The chromium-based catalyst is particularly suitable for producing polyethylene homopolymers, and copolymers of ethylene monomer and 1-hexene comonomer. The polymer density of such copolymers may be controlled by varying the comonomer to monomer ratio in the reactor.

Any suitable polymerization methods known in the art may be used, such as solution polymerization, slurry polymerization, and gas phase polymerization. Any polymerization reactor known in the art that is capable of polymerizing olefin monomers to produce the homopolymers or copolymers described herein also may be used. Such reactors can comprise slurry reactors, gas-phase reactors, solution reactors or any combination thereof. Gas phase reactors can comprise fluidized bed reactors or tubular reactors. Slurry reactors can comprise vertical loops or horizontal loops. Solution reactors can comprise stirred tank or autoclave reactors. Such reactors can be combined into multiple reactor systems operated in parallel or in series.

Any manner known in the art may be employed to contact the monomer with the catalyst in the reaction zone. As mentioned previously, the cocatalyst may be co-supported with the catalyst, or it may alternatively be separately introduced to a reaction zone. Suitable contact methods include fluidized bed, gravitating bed, and fixed bed methods. In one embodiment, the catalyst and the cocatalyst streams are both continuously fed into a pre-contacting reaction zone prior to adding the mixture into the polymerization reactor. In this pre-contacting reaction zone, the two components react with each other at temperatures ranging from about −10° C. to about 100° C. during residence times typically ranging from about 1 minute to about 2 hours. After the two components have contacted each other for the specified duration, the combination is then fed continuously into the polymerization reactor.

In one embodiment, the polymerization is carried out using a plurality of stirred tank reactors either in series, parallel, or combinations thereof. Different reaction conditions may be used in the different reactors. In another embodiment, the polymerization is conducted in a loop reactor using slurry polymerization. Suitable loop reactors are disclosed in U.S. Pat. Nos. 3,248,179, 5,565,175 and 6,239,235, which are incorporated by reference herein in their entirety. Within the loop reactor, the catalyst and the cocatalyst are suspended in an inert diluent and agitated to maintain them in suspension throughout the polymerization process. The diluent is a medium in which the polymer being formed does not readily dissolve. In an embodiment, the diluent is isobutane in which the polymer tends to swell less than in other diluents. It is understood that other diluents may be utilized as deemed appropriate by one skilled in the art. In an embodiment in which ethylene is polymerized in the loop reactor, the amount of ethylene present is in the range of from about 1% to about 20% by the weight of the diluent, or alternatively from about 3% to about 8%. When a comonomer such as 1-butene or 1-hexene is used, it is added to the reactor in an amount sufficient to yield a polymer having a desired density, which is usually in the range of from about 0.92 to about 0.96 g/cc. In a loop reactor this amount is typically in the range of from about 0.1% to about 20% by weight of the diluent.

The slurry polymerization conditions are selected to ensure that the polymer being produced has certain desirable properties and is in the form of solid particles. The polymerization is desirably carried out below a temperature at which the polymer swells or goes into solution. For example, the polymerization temperature may be less than about 110° C., alternatively in the range of from about 85° C. to about 110° C. The catalyst system is contacted with the at least one monomer at a pressure sufficient to maintain the diluent and at least a portion of the monomer in the liquid phase. That is, the pressure within the loop reactor may be maintained in the range of from about 110 psi to about 700 psi or higher. Suitable slurry polymerization processes are disclosed in U.S. Pat. Nos. 4,424,341, 4,501,855, and 4,613,484, 4,589,957, 4,737,280, 5,597,892, and 5,575,979, each of which is incorporated by reference herein in its entirety. The activity and the productivity of the catalyst system are relatively high. As used herein, the activity refers to the grams of polymer produced per gram of solid catalyst charged per hour, and the productivity refers to the grams of polymer produced per gram of solid catalyst charged.

Additional details regarding chromium-based catalysts and/or slurry polymerization processes can be found in U.S. Pat. Nos. 3,887,494, 3,900,457, 3,947,433, 4,053,436, 4,081,407, 4,151,122, 4,294,724, 4,296,001, 4,345,055, 4,364,839, 4,364,841, 4,364,842, 4,364,854, 4,364,855, 4,392,990, 4,397,765, 4,402,864, and 4,405,501, each of which is incorporated by reference herein in its entirety.

According to an embodiment, hydrogen ($H_2$) may be introduced to the polymerization reaction zone to control molecular weight. The $H_2$ may be employed at concentrations of equal to or less than about 3 mole % based on the total number of moles of the diluent in a loop reactor, alternatively from about 0.1 mole % to about 2 mole %. Polymerizing the olefin in the presence of the cocatalyst and the hydrogen broadens the molecular weight distribution of the polymer and generally improves the properties of the polymer. For example, the use of the cocatalyst in conjunction with the hydrogen results in an increase in the melt index (MI) and the high-load melt index (HLMI) of the polymer produced, whereas the MI and the HLMI of the polymer drop when the cocatalyst is used without any hydrogen present. Without intending to be limited by theory, it is believed that the presence of the cocatalyst causes the sites on the catalyst that usually produce low molecular weight polymer to convert to chromocenyl sites that reject the comonomer, e.g., hexene, and are more sensitive to $H_2$.

When the metal Cp cocatalyst is included in the catalyst system added to the reactor in the presence of hydrogen, the weight average molecular weight ($M_W$) of the polymer formed therein increases while the number average molecular weight ($M_N$) decreases substantially, as compared to using the same catalyst system run under the same reactor conditions in the presence of the same amount of hydrogen, but without the metal Cp cocatalyst. Typically, the $M_W$ may increase by equal to or greater than about 25%, alternatively by equal to or greater than about 50%, or alternatively by equal to or greater than about 80%. Increases of equal to or greater than about 100% also may result, depending on the catalyst type and the amount of hydrogen and metal Cp catalyst used. Further, the $M_N$ may decrease by equal to or greater than about 20%, alternatively by equal to or greater than about 40%, alternatively by equal to or greater than about 50%, or alternatively on occasion by equal to or greater than about 60%.

Likewise, the MI and HLMI of the polymer produced increase when the metal Cp cocatalyst is added to the reactor to which hydrogen is also added, as compared to the same polymer made with the same catalyst under the same reactor conditions but in the absence of the metal Cp cocatalyst. The MI or HLMI typically increases by equal to or greater than about 50%, alternatively by equal to or greater than about 100%, or alternatively by equal to or greater than about 500%. They may even increase by equal to or greater than ten fold, depending on the catalyst type, the amount of metal Cp cocatalyst used, and the amount of hydrogen used.

Polymer compositions or resins produced using the chromium-based catalyst in conjunction with the non-transition metal Cp cocatalyst have unique properties. Examples of the polymer compositions include polyethylene homopolymers and copolymers of ethylene monomer and 1-hexene comonomer. For example, the polymer compositions have a weight-average molecular weight greater than about 100,000 g/mol. Alternatively, the $M_W$ may be greater than about 250,000 g/mol, greater than about 400,000 g/mol, greater than about 500,000 g/mol, or greater than about 600,000 g/mol. Also, the polymer compositions have broad MWD's as indicated by PDI values greater than about 20. In some embodiments, the polymer compositions have PDI values, greater than about 30, greater than about 40, greater than about 50, greater than about 70, or greater than about 90.

The molecular weights and the molecular weight distributions of the polymer compositions are obtained using a Waters 150 CV gel permeation chromatograph with trichlorobenzene (TCB) as the solvent using a flow rate of 1 mL/min at a temperature of 140° C. The TCB is stabilized using 2,6-Di-t-butyl-4-methylphenol (BHT) at a concentration of 1.0 g/L. An injection volume of 220 microliters is used with a nominal polymer concentration of 0.3 g/L at room temperature. The polymer sample is dissolved in stabilized TCB by heating it at about 160 to 170° C. for 20 hours while performing occasional gentle agitation. The gel permeation chromatograph includes two Waters HT-6E columns (7.8 mm×300 mm). The columns are calibrated with a broad linear polyethylene standard (Phillips Marlex® BHB 5003 resin) for which the molecular weight has been determined.

Rheological breadth refers to the breadth of the transition region between Newtonian and power-law type shear rate for a polymer or the frequency dependence of the viscosity of the polymer. The rheological breadth is a function of the relaxation time distribution of a polymer resin, which in turn is a function of the resin molecular structure or architecture. Assuming the Cox-Merz rule, the rheological breadth may be calculated by fitting flow curves generated in linear-viscoelastic dynamic oscillatory frequency sweep experiments with a modified Carreau-Yasuda (CY) model, which is represented by the following equation:

$$E = E_o[1 + (T_\xi \dot\gamma)^a]^{\frac{n-1}{a}}$$

where
E=viscosity (Pa·s)
$\dot\gamma$=shear rate (1/s)
"a"=rheological breadth parameter
$T_\xi$=relaxation time (s) [describes the location in time of the transition region]

$E_o$=zero shear viscosity (Pa·s) [defines the Newtonian plateau]
n=power law constant [defines the final slope of the high shear rate region]

To facilitate model fitting, the power law constant is held at a constant value. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids, Volume* 1, *Fluid Mechanics*, 2nd Edition, John Wiley & Sons (1987), each of which is incorporated by reference herein in its entirety. The polymer compositions have rheological breadth parameters, i.e., "a" parameters, greater than about 0.15, as determined at a temperature of 190° C. Alternatively, the "a" parameters are greater than about 0.18, greater than about 0.19, or greater than about 0.20.

In addition, the zero shear viscosity ($E_o$) values, of the polymer compositions are less than about $10^8$ Pa·s. In one embodiment, the $E_o$ values are greater than about $10^5$ Pa·s and less than about $10^8$ Pa·s. In yet another embodiment, the $E_o$ values greater than about $10^5$ Pa·s and less than about $5\times10^7$ Pa·s. In still another embodiment, the $E_o$ values are greater than about $10^5$ Pa·s and less than about $10^7$ Pa·s. In another embodiment, the $E_o$ values are greater than about $10^5$ Pa·s and less than about $5\times10^6$ Pa·s.

Polymer compositions having the previously described properties may be formed into articles of manufacture or end use articles using techniques known in the art such as extrusion, blow molding, injection molding, fiber spinning, thermoforming, and casting. For example, a polymer resin may be extruded into a sheet, which is then thermoformed into an end use article such as a container, a cup, a tray, a pallet, a toy, or a component of another product. Examples of other end use articles into which the polymer resins may be formed include pipes, drums, films, bottles, fibers, and so forth. Additional end use articles would be apparent to those skilled in the art.

In an embodiment, pipes are formed from the foregoing polymer compositions using, for example, extrusion. The densities of the polymer pipes range from about 0.92 g/cc to about 0.97 g/cc. Alternatively, the densities range from about 0.93 g/cc to about 0.965 g/cc, from about 0.94 g/cc to about 0.96 g/cc, or from about 0.945 g/cc to about 0.955 g/cc. Polymer density is determined in grams per cubic centimeter (g/cc) on a compression molded sample that is cooled at about 15° C. per hour and conditioned for about 40 hours at room temperature in accordance with ASTM D1505 and ASTM D1928, procedure C.

The melt index of a polymer resin represents the rate of flow of a molten resin through an orifice of 0.0825 inch diameter when subjected to a force of 2,160 grams at 190° C. Further, the high load melt index of a polymer resin represents the rate of flow of a molten resin through an orifice of 0.0825 inch diameter when subjected to a force of 21,600 grams at 190° C. The MI values of the polymer pipes are in a range of from about 0.01 g/10 min to about 10 g/10 min, alternatively from about 0.1 to about 10 g/10 min. Alternatively, the polymer pipes may have MI values in the range of from about 0.05 g/10 min to about 5 g/10 min, from about 0.1 g/10 min to about 1.0 g/10 min, or from about 0.2 g/10 min to about 0.5 g/10 min. The MI values are determined in accordance with ASTM D1238. The polymer pipes have HLMI values in the range of from about 0.1 to about 100 g/10 min, from about 1 to about 10 g/10 min, from about 1 to about 50 g/10 min, from about 2 to about 20 g/10 min, or from about 4 to about 15 g/10 min. The HLMI values are determined in accordance with ASTM D1238 condition E. In addition, the shear ratio (HLMI/MI) values of the polymer pipes are greater than about 80, greater than about 100, greater than about 150, or greater than about 200.

Charpy impact testing is one method of predicting the pipe's resistance to rapid crack growth at low temperatures. In this test, compression molded plastic bars are cooled to various temperatures, and subjected to an impact test. The temperature at which a crack in a bar transitions from ductile to brittle failure is recorded, as well as the total energy at each temperature required to break the bar. Details of the test can be found in ASTM F2231. Results are usually reported as 1) the ductile to brittle transition temperature $T_{db}$ (i.e., the Charpy critical temperature), and 2) the specific energy of breakage at a certain reference temperature, usually 0° C. (i.e., the Charpy impact energy). The lower the $T_{db}$ and the higher the impact energy, the better the resin's resistance to rapid crack growth. The polymer pipes described herein have a low $T_{db}$ less than about 0° C. and a Charpy impact energy greater than about 50 J/m. Alternatively, the $T_{db}$ is less than about −5° C., less than about −10° C., or less than about −20° C. Alternatively, the Charpy impact energy is greater than about 75 J/m, greater than about 100 J/m, or greater than about 125 J/m.

The resistance of a pipe to slow crack growth is measured by pressurizing a section of a notched pipe (ASTM F1474; ISO 13479). The resistance of a pipe material to slow crack growth is well studied and documented. Typically, the resistance to slow crack growth of pipe products improves with increasing molecular weight, decreasing crystallinity (or density) of the starting resin, and proper placement of short chain branching in the molecular weight distribution. The inherent resistance of a pipe to slow crack growth is measured in tests such as the Pennsylvania notched-tensile test (PENT; ASTM F1473) using compression-molded specimens. Sample bars are subjected to a constant load at 80° C. until they finally break. The polymer pipes described herein display high Pent values of greater than about 500 h, greater than about 700 h, or greater than about 1,000 hours.

In another embodiment, the previously described polymer compositions are blow molded into bottles. The MI values of the blow molded bottles are in the range of from about 0.01 to about 10 g/10 min, alternatively from about 0.1 to about 10 g/10 min. Alternatively, the blow molded bottles may have MI values in the range of from about 0.1 g/10 min to about 1 g/10 min, from about 0.15 g/10 min to about 0.5 g/10 min, or from about 0.18 g/10 min to about 0.4 g/10 min. The blow molded bottles also have HLMI values in the range of from about 1 to about 1,000 g/10 min, from about 1 to about 10 g/10 min, from about 5 to about 100 g/10 min, from about 10 to about 80 g/10 min, from about 15 to about 50 g/10 min, or from about 18 to about 35 g/10 min.

Environmental Stress Crack Resistance (ESCR) measures a polymer's resistance to chemical attack and can be determined using ASTM D 1693, condition A and condition B. For blow molded bottles having HLMI values ranging from about 15 to about 30 g/10 min and densities greater than or equal to about 0.952, both their ESCR-A values and their ESCR-B values are greater than about 250, greater than about 500, greater than about 800, or greater than about 1,000.

A polymer often tends to swell during blow molding extrusion. Percent weight swell measures the amount the molten resin expands immediately as it exits the die. It is a measure of the "memory" of the polymer chains as they seek to relax and thus reform the polymer shape. Weight swell is an important parameter as it determines how tight the die gap must be adjusted to provide a constant bottle weight. If a resin has high weight swell, the die gap required will be tighter to make the proper part weight. In so doing, it will require higher stress to push the resin through the die than a lower weight swell resin. Weight swell is defined as the ratio of the die gap to the final bottle wall thickness. The weight swell values of the polymer compositions described herein are usually less than about 700, less than about 500, less than about 450, or less than about 400.

As a polymer is subjected to increasing shear rates during extrusion, it eventually slips or experiences a so-called melt fracture. In an embodiment, the shear rates at the onset of melt fracture for the blow molded polymers are greater than about 22,000/sec. Alternatively, the shear rates are greater than about 24,000/sec, greater than about 26,000/sec, or greater than about 28,000/sec.

EXAMPLES

The invention having been generally described, the following examples are given as particular embodiments of the invention and to demonstrate the practice and advantages thereof. It is understood that the examples are given by way of illustration and are not intended to limit the specification or the claims to follow in any manner.

Example 1

A grade 963 chromium oxide/silica-titania catalyst obtained from W.R. Grace Corporation was activated in air at 800° C. To activate the catalyst, about 10 grams were placed in a 1.75 inch quartz tube fitted with a sintered quartz disk at the bottom. While the catalyst was supported on the disk, dry air was blown up through the disk at the linear rate of from about 1.6 to about 1.8 standard cubic feet per hour. An electric furnace around the quartz tube was then turned on and the temperature was raised at the rate of 400° C. per hour to the indicated temperature, i.e., 800° C. At that temperature the catalyst was allowed to fluidize for three hours in the dry air. The temperature was then lowered to 350° C. where the air was flushed out with dry nitrogen, and then the catalyst was reduced in the presence of carbon monoxide (CO) for 30 minutes. After a final flushing out of the CO with nitrogen, the catalyst was collected and stored under dry nitrogen, where it was protected from the atmosphere until ready for testing. It was never allowed to experience any exposure to the atmosphere.

The catalyst was then employed in four different runs to polymerize ethylene. The polymerization runs were made in a 2.2 liter steel reactor equipped with a marine stirrer running at 400 rpm. The reactor was surrounded by a steel jacket containing boiling methanol and connected to a steel condenser. The boiling point of the methanol was controlled by varying nitrogen pressure applied to the condenser and jacket, which permitted precise temperature control to within half a degree centigrade, with the help of electronic control instruments.

Unless otherwise stated, a small amount (normally 0.01 to 0.10 grams) of the catalyst was first charged under nitrogen to the dry reactor. Next 0.6 liter of isobutane liquid was added to the reactor, followed by a solution containing the non-transition metal Cp cocatalyst, and finally by another 0.6 liter of isobutane liquid. Then the reactor was heated up to 95° C., followed by the addition of 30 psig of hydrogen gas ($H_2$). Finally ethylene was added to the reactor to equal a fixed pressure of 550 psig. The reaction mixture was stirred for about one hour. As ethylene was consumed, more ethylene flowed into the reactor to maintain the pressure. The activity was noted by recording the flow of ethylene into the reactor to maintain the set pressure.

After the allotted time, the ethylene flow was stopped and the reactor was slowly depressurized and opened to recover a granular polymer powder. In all cases, the reactor was clean with no indication of any wall scale, coating, or other forms of fouling. The polymer powder was then removed and weighed. The activity was specified as grams of polymer produced per gram of solid oxide component charged per hour.

Run 1 was performed in the absence of a cocatalyst, runs 2 and 3 were run using different amounts of the trimethylsilyl-cyclopentadienyl lithium (TMS-Cp-Li) as a cocatalyst, and run 4 was run using biscyclopentadienyl magnesium ($Cp_2Mg$) as a cocatalyst. Table 1 below provides details regarding each run and the MI, HLMI, HLMI/MI, $M_N$, $M_W$, and PDI values of the polymer resin produced in each run. The methods used to determine such values are disclosed above. As shown in Table 1, the MI and HLMI values increased substantially when a non-transition metal Cp cocatalyst was used with $H_2$. When used without $H_2$, the melt index actually dropped, thus supporting the theory that chromocenyl sites form on the catalyst when the cocatalyst and $H_2$ are used. In addition, the breadth of the MWD, i.e., the PDI, increased when the cocatalyst was used with $H_2$.

Example 2

A 969 MPI grade Cr/silica-titania catalyst was obtained from W.R. Grace and activated in air at 650° C. in the same manner as described in Example 1. It was then reduced in the presence of CO at a temperature of about 370° C. The catalyst was then employed in several runs to polymerize ethylene at 95° C. as described in Example 1. Most but not all of the runs were performed in the presence of $H_2$. Some runs were performed using no cocatalyst, and some runs were performed using $Cp_2Mg$ cocatalyst, one of which additionally used triethylaluminum (TEA) cocatalyst. Other runs were performed using CpLi cocatalyst. Table 2 below provides details regarding each run and the MI, HLMI, HLMI/MI, $M_N$, $M_W$, and PDI values of the polymer resins produced in each run. The methods used to determine such values are disclosed above. As shown in Table 2, the MI and HLMI values generally increased when a non-transition metal Cp cocatalyst was used with $H_2$. In addition, the breadth of the MWD, i.e., the PDI, increased when the cocatalyst was used with $H_2$.

Example 3

A 963 grade Cr/silica-titania catalyst obtained from W.R. Grace Corp., was calcined in air at 650° C. as described above in Example 1. It was then reduced in the presence of CO at a temperature of about 370° C. The catalyst was then employed in two different runs to polymerize ethylene as described in Example 1. One run was performed in the absence of a cocatalyst and in the absence of $H_2$. The other run was performed using $Cp_2Mg$ as a cocatalyst and in the presence of $H_2$. Table 3 below provides details regarding each run and the MI, HLMI, HLMI/MI, $M_N$, $M_W$, and PDI values of the polymer resin produced in each run. The methods used to determine such values are disclosed above. As shown in Table 3, the MI and HLMI values increased substantially when the $Cp_2Mg$ cocatalyst was used with $H_2$. In addition, the breadth of the MWD, i.e., the PDI, increased when the cocatalyst was used with $H_2$.

Example 4

A 969 MPI grade Cr/silica-titania catalyst was obtained from W.R. Grace Corp. and calcined in air at 650° C. as described in Example 1. The catalyst and 4 ppm of $Cp_2Mg$ cocatalyst based on the weight of the isobutane added were then employed in three runs to polymerize ethylene in the presence of $H_2$ at 95° C. and 30 psig. The catalyst was reduced in the presence of CO at a temperature of about 371° C. before two of the three runs. A triethylaluminum cocatalyst was additionally used in one of these runs. The catalyst and the cocatalyst(s) were suspended in an isobutane diluent within a pipe loop reactor during these different runs. Table 4 below provides details regarding each run and the MI, HLMI, HLMI/MI values of the polymer resins produced in each run. The methods used to determine such values are disclosed above. These values improved when TEA cocatalyst was used to supplement the $Cp_2Mg$ catalyst. In the run in which the catalyst had not been reduced beforehand, the catalyst exhibited little activity.

TABLE 1

| Run # | Non-Transition Metal Cp Treatment | Catalyst Charge (g) | Yield (g) | Run Time (min.) | Prod. (g/g) | Activity (g/g/h) | MI (g/10 min.) | HLMI (g/10 min.) | HLMI/MI | $M_N$ (kg/mol) | $M_W$ (kg/mol) | PDI |
|---|---|---|---|---|---|---|---|---|---|---|---|---|
| 1 | none | 0.0452 | 69.5 | 74.5 | 1538 | 1238 | 0.12 | 7.6 | 63 | 15.4 | 165.2 | 10.7 |
| 2 | 4 ppm TMS-Cp-Li | 0.1796 | 279 | 54 | 1553 | 1726 | 0.18 | 25.4 | 141 | 6.3 | 367.5 | 58.2 |
| 3 | 11.3 ppm TMS-Cp-Li | 0.1176 | 155 | 50 | 1318 | 1582 | 0.945 | 107.6 | 114 | 5.1 | 238.5 | 46.6 |
| 4 | 4 ppm $Cp_2Mg$ | 0.0891 | 74.5 | 77.1 | 836 | 651 | 1.58 | 224.3 | 142 | 4.3 | 255.0 | 59.3 |

TABLE 2

| Run # | Non-Transition Metal Cp Treatment | $H_2$, psig on Rx | Catalyst Charge (g) | Yield (g) | Run Time (min.) | Prod. (g/g) | Activity (g/g/h) | MI (g/10 min.) | HLMI (g/10 min.) | HLMI/MI | $M_N$ (kg/mol) | $M_W$ (kg/mol) | PDI |
|---|---|---|---|---|---|---|---|---|---|---|---|---|---|
| 5 | none | 0 | 0.0536 | 133 | 62 | 2481 | 2401 | 0 | 0.4 | | 32.8 | 724.4 | 22.0 |
| 6 | none | 30 | 0.0848 | 267 | 68 | 2624 | 2315 | 0 | 0.81 | | 33.4 | 641.0 | 19.2 |
| 7 | 1 ppm $Cp_2Mg$ | 30 | 0.1054 | 208 | 60 | 1973 | 1973 | 0 | 0.95 | | 21.7 | 812.3 | 37.5 |
| 8 | 2 ppm $Cp_2Mg$ | 30 | 0.1045 | 143 | 70 | 1368 | 1173 | 0 | 2.05 | | 15.6 | 851.2 | 54.7 |
| 9 | 4 ppm $Cp_2Mg$ | 30 | 0.0798 | 61 | 64 | 764 | 717 | 0 | 4.6 | | 13.0 | 753.6 | 58.0 |
| 10 | 5.4 ppm $Cp_2Mg$ | 30 | 0.1042 | 50 | 60 | 480 | 480 | 0.017 | 6.92 | 407 | 10.2 | 574.9 | 56.4 |
| 11 | 4 ppm $Cp_2Mg$ + 8 ppm TEA | 30 | 0.0998 | 105 | 65 | 1052 | 971 | 0.033 | 8.7 | 263 | 10.4 | 554.5 | 53.2 |

TABLE 2-continued

| Run # | Non-Transition Metal Cp Treatment | $H_2$, psig on Rx | Catalyst Charge (g) | Yield (g) | Run Time (min.) | Prod. (g/g) | Activity (g/g/h) | MI (g/10 min.) | HLMI (g/10 min.) | HLMI/MI | $M_N$ (kg/mol) | $M_W$ (kg/mol) | PDI |
|---|---|---|---|---|---|---|---|---|---|---|---|---|---|
| 12 | 6 ppm $Cp_2Mg$ | 0 | 0.0982 | 50 | 60 | 509 | 509 | 0 | 0 | | | | |
| 13 | 1 ppm CpLi | 30 | 0.0942 | 61 | 68 | 648 | 571 | 0 | 1.52 | | 20.2 | 675.4 | 33.5 |
| 14 | 4 ppm CpLi | 30 | 0.1014 | 27 | 63 | 266 | 254 | 0 | 2.84 | | | | |

TABLE 3

| Run # | Non-Transition Metal Cp Treatment | $H_2$, psig on Rx | Catalyst Charge (g) | Yield (g) | Run Time (min.) | Prod. (g/g) | Activity (g/g/h) | MI (g/10 min.) | HLMI (g/10 min.) | HLMI/MI | $M_N$ (kg/mol) | $M_W$ (kg/mol) | PDI |
|---|---|---|---|---|---|---|---|---|---|---|---|---|---|
| 15 | none | 0 | 0.0436 | 168 | 94 | 3853 | 2459 | 0 | 0.79 | | 20.2 | 736.0 | 36.4 |
| 16 | 1 ppm $Cp_2Mg$ | 30 | 0.0566 | 70 | 60 | 1237 | 1237 | 0.0254 | 6.55 | 258 | 7.2 | 838.5 | 116.3 |

TABLE 4

| Run # | CO Reduction | Other Cocatalyst | Catalyst Charge (g) | Yield (g) | Run Time (min.) | Prod. (g/g) | Activity (g/g/h) | MI (g/10 min.) | HLMI (g/10 min.) | HLMI/MI |
|---|---|---|---|---|---|---|---|---|---|---|
| 17 | none | none | 0.0873 | 2 | 53 | 23 | 26 | | | |
| 18 | 371C | none | 0.0798 | 61 | 64 | 764 | 717 | 0 | 4.6 | |
| 19 | 371C | 8 ppm TEA | 0.0998 | 105 | 65 | 1052 | 971 | 0.033 | 8.7 | 263 |

Example 5

A 963 grade Cr/silica-titania catalyst was calcined in air at 800° C. and reduced in the presence of CO at a temperature of about 370° C., as described in Example 1. The catalyst was then employed in three different runs to polymerize ethylene in the presence of $H_2$ at 95° C. and 30 psig, again as described in Example 1. A first run was performed using TMS-Cp-Li as the cocatalyst, a second run was performed using $Cp_2Mg$ as the cocatalyst, and a third run was performed using no cocatalyst. FIG. 1 illustrates the molecular weight distributions of the polymer resins produced in these runs. The breadths of the molecular weight distributions of the polymer resins produced using the non-transition metal Cp cocatalysts were greater than that of the polymer resin produced in the absence of such cocatalyst. They were also shifted to the left, indicating an exaggerated effect of $H_2$ due to the influence of the Cp compound.

Example 6

Figure 2:
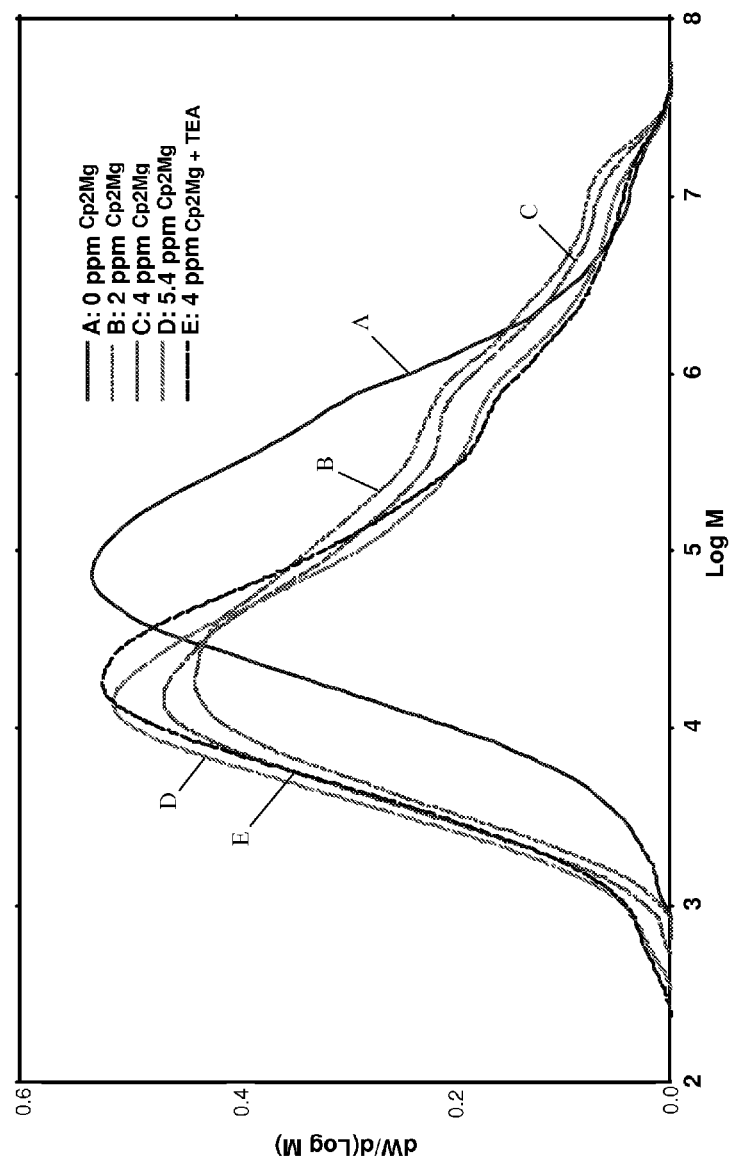
FIG. 2 depicts a graph illustrating the molecular weight distributions of polyethylene resins formed using a chromium-based catalyst and different concentrations of a dicyclopentadienyl magnesium cocatalyst and of a polyethylene resin formed using a chromium-based catalyst and a triethylaluminum cocatalyst.

A 969 MPI Cr/silica-titania catalyst was calcined in air at 650° C. as described in Example 1. It was then reduced in the presence of CO at a temperature of about 370° C. The catalyst was then employed in several runs to polymerize ethylene in the presence of $H_2$ at 95° C. and 30 psig, again as described in Example 1. All runs but one were performed using $Cp_2Mg$ cocatalyst, and one additional run was performed using 8 ppm of TEA cocatalyst along with the $Cp_2Mg$ cocatalyst. FIG. 2 illustrates the molecular weight distributions of the polymer resins produced in these runs. Again, the breadths of the molecular weight distributions of the polymer resins produced using the non-transition metal Cp cocatalysts were greater than that of the polymer resin produced in the absence of such cocatalyst. They were also shifted to the left, indicating the effect of $H_2$.

Example 7

Figure 3:
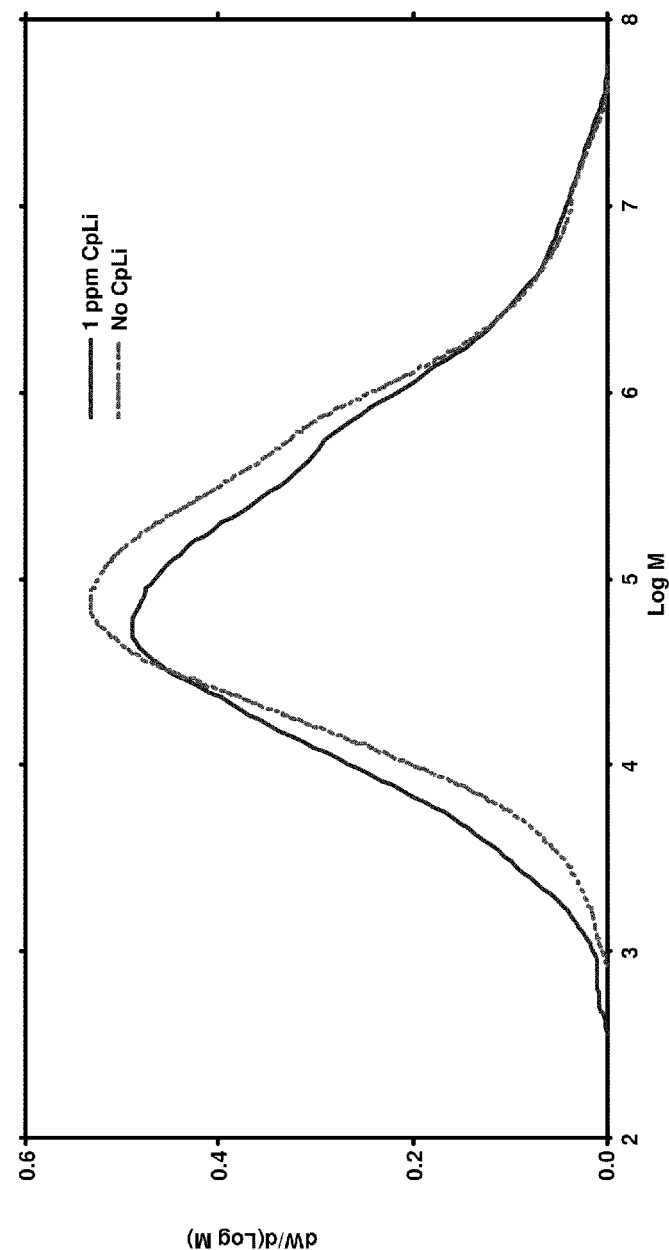
FIG. 3 depicts a graph illustrating the molecular weight distributions of two polyethylene resins formed using a chromium-based catalyst, wherein one is formed with a cyclopentadienyl lithium cocatalyst and one is formed without a cocatalyst.

A 969 MPI grade Cr/silica-titania catalyst was calcined in air at 600° C. and reduced in the presence of CO at a temperature of about 370° C. as described in Example 1 The catalyst was then employed in two different runs to polymerize ethylene in the presence of $H_2$ at 95° C. and 30 psig as described in example 1. A first run was performed using CpLi as the cocatalyst, and a second run was performed using no cocatalyst. FIG. 3 illustrates the molecular weight distributions of the polymer resins produced in these runs. The breadth of the molecular weight distribution of the polymer resin produced using the CpLi cocatalyst was slightly greater than that of the polymer resin produced in the absence of such cocatalyst. Again, it was shifted to the left, indicating that the effect of $H_2$ was exaggerated by the cocatalyst.

Example 8

The following procedure was followed to produce polymer resins in a pilot plant reactor. Larger quantities of grade 964 Cr/silica-titania catalyst than in previous examples were activated by calcination in air at 650° C. for use in a 23-gallon loop reactor. Then 1.5 pounds of the catalyst were charged to a 6-inch diameter stainless steel furnace, which was heated by electric heating coils surrounding it. Dry air rose up through a sintered metal grid plate at the rate of 0.12 to 0.20 linear feet per second to fluidize the catalyst. The catalyst was heated up to the desired temperature, i.e., 650° C. in this example, over a period of about five hours. It was held at that temperature for another six hours. The catalyst was given a final treatment in carbon monoxide (CO) before being discharged from the furnace and stored under nitrogen. This was done in order to reduce the hexavalent chromium to its divalent state. This was accomplished by cooling down the catalyst from 650° C. to 370° C. while fluidizing the catalyst in dry air. The air was then replaced by nitrogen for about 10 minutes, and then about 10% CO by volume of the total gas was added. This CO treatment lasted 1 hour, after which the catalyst was flushed clean with nitrogen for about 1 hour and cooled down to room temperature and stored under dry nitrogen until being used. About 65% to 85% of the catalyst weight charged was recovered. The lost weight was water and very fine material.

While the original hexavalent catalysts were usually orange or yellow, this reduced divalent catalyst appeared blue and chemiluminesced brightly when exposed to oxygen.

The activated catalyst was employed in various runs with different amounts of $Cp_2Mg$ cocatalyst to polymerize ethylene that had been dried over activated alumina. Liquid isobutane that had been degassed by fractionation and dried over alumina was used as the diluent.

The reactor was a 15.2 cm diameter pipe loop filled with liquid and having a volume of 23 gallons (87 liters). The reactor pressure was about 600 psig. The reactor temperature was varied over the range of 88° C. to 94° C. The reactor was operated to have a residence time of 1.25 hours. The catalyst was added through a 0.35 cc circulating ball-check feeder. At steady state conditions the isobutane feed rate was about 46 L/hr and the ethylene feed rate was about 30 lbs/hr. The ethylene concentration in the diluent was 8 to 12 mole %. Hydrogen was added in concentrations ranging from 0.4 to 1.1 mole % based on the total moles of the diluent. The $Cp_2Mg$ cocatalyst was added in concentrations ranging from 0.25 to 1.1 parts per million by weight of the diluent. The $Cp_2Mg$ cocatalyst was added as a hydrocarbon stream into a pre-contacting vessel into which the catalyst was also added continuously. The isobutane flow through the pre-contacting vessel was adjusted so that the contact time between the catalyst and cocatalyst was about 20 minutes on average. After that amount of time, the contacted catalyst and cocatalyst are then fed into the reactor. To prevent static buildup in the reactor, a small amount (<5 ppm of diluent) of STADIS 450 antistatic agent sold by Octel Corp. was usually added. The polymer was removed from the reactor at a rate of about 25 lbs/hour and recovered in a flash chamber. A Vulcan dryer was used to dry the polymer under nitrogen at about 60 to 80° C.

The polymers produced in these runs were blown into 1 mil (0.001 inch)-thick films on a high density processing line. The line used was a 1.5 inch diameter Davis-Standard extruder with L/D of 24:1, having a barrel temperature of from 210° C. to 230° C., a screw speed of 30 rpm, and an output of 17 to 18 pounds per hour, feeding a 2 inch diameter Sano die having a 35 mil gap. Films of typically 0.001-0.0005 inch (1 to 0.5 mil) thickness were blown on a 4:1 blow-p ratio and a production rate of 65 ft/min. Frostline heights were usually 14 inches. After cooling, the film passed through an A-frame with a resultant flattened width of 12.5 inches.

Various properties of the films produced using the $Cp_2Mg$ cocatalyst were tested and compared to the same properties of a 1 mil (0.001 inch) thick film produced from a commercial high density film resin sold by Chevron Phillips Chemical Company LLC and its licensees as TR-130 resin. The results of these tests are shown in Table 5 below. In particular, the density and melt index of each film resin was determined in the manner described previously. Each film was subjected to the dart impact test in accordance with ASTM D 1709-75. The dart impact test is a standard test method for determining the impact resistance of polyethylene films. It is the energy needed to rupture a one millimeter thick film upon impact of a free falling dart. This method establishes the weight of the dart dropped from a height of 26 inches, which causes 50% of the samples to break. All but one of the $Cp_2Mg$ produced films had dart impacts higher than or comparable to the TR-130 produced film. Another measure of film toughness is the Spencer Impact resistance (also known as the pendulum impact strength). The Spencer Impact resistance of each film was also determined in accordance with ASTM D 3420. These values of the $Cp_2Mg$ produced films were higher than or similar to that of the TR-130 produced film.

Each film was further subjected to a tear resistance test in accordance with ASTM D 1922. This test is a standard test method for determining the propagation tear resistance of a polymer film and is a modification of the Elmendorf tear test used for paper. The method determines the average energy in grams required to propagate a tear through 2.5 inches of film in the machine extrusion direction (MD) or transverse direction (TD) as indicated. The MD and TD tear resistances of the $Cp_2Mg$ produced films were substantially higher than those of the TR-130 produced film.

Table 5 also shows the motor load in amperes and the die pressure in psig generated while processing the film. They indicate the amount of resistance the molten polymer offered against the screw. One can see that the polymers produced with a metal Cp cocatalyst in general processed with greater ease than the control polymer, even though many of them had higher melt viscosity values (lower melt index values). The ease of processing can determine the rate at which film can be processed and thus the capacity of a film line.

Example 9

As shown in Table 6, Cr/silica-titania catalyst grades 963 and 964 from W.R. Grace were used to produce polymer resins in a pilot plant reactor as described above in Example 8. The catalysts were activated at 600° C. and 650° C., followed in many cases by reduction in CO at 370° C. The reactor temperature was 82 to 91° C., the ethylene concentration was 10 to 14% by moles of the diluent, and the hydrogen concentration was 0.3 to 0.4% by moles of the diluent. As indicated in Table 6, a $Cp_2Mg$ cocatalyst was used in most of the runs in concentrations ranging from 0.25 to 1 ppm based on the weight of the diluent. However, one run was performed with no cocatalyst and another run was performed with TEB as the cocatalyst.

The polymer resins produced in these runs were extruded into pipes. The pipe extrusion was performed by melting and conveying polyethylene pellets into an annular shape and solidifying that shape during a cooling process. All pipe products tested in this study were made using a 2 inch Davis-Standard Single Screw Extruder (smoothbore) and a 220° C. set temperature on the extruder and die. The samples were extruded at 150 lb/hr using a Barrier screw. The melt temperatures ranged from 232 to 238° C. A two inch die was used. To cool the pipe and "freeze in" the desired dimensions, cooling was accomplished by the use of several water tanks where the pipe was sprayed with water on the pipe exterior. Thus, the pipe was cooled from the outside surface to the inside surface. Per D2513 "Standard Specification for Thermoplastic Gas Pressure Pipe, Tubing, and Fittings", the maximum wall thickness eccentricity is 12% and the maximum ovality is 5%. The resins produced using metal Cp cocatalysts fell within those values.

A TR-480 pipe resin sold by Chevron Phillips Chemical Company and made from a chromium-based catalyst was tested as the control. Also, an H516 polyethylene resin sold by Chevron Phillips Chemical Company was tested as a control. It was made using a Ziegler-Natta catalyst in a bimodal process. A third control resin was produced using the same catalyst but a different cocatalyst, i.e., triethylboron, was used.

Various properties of the pipes were tested, and the results of these tests are shown in Table 6. The HLMI, density, $M_W$, $M_N$, and PDI of each resin, and the Charpy critical temperature, Charpy energy, and PENT of each pipe were tested using the methods described previously. Normally PENT increases as the density of the resin decreases. However, one can see in the table that some of the polymers described herein, despite having higher densities, also have higher PENT values than the control resins that are even equivalent to the bimodal grade H516 resin, which is more difficult to make and to process into pipe. The Charpy critical temperatures were also much lower for the polymers described herein, which indicates high resistance to rapid crack propagation. The total energy adsorbed (at 25° C. Charpy Impact) was also very high for all of the polymers described herein relative to the control resins.

Standard PE-100 screening hoop stress tests were also run on these polymers. In this test, a two foot length of pipe was pressured to the indicated pressure and then immersed in a water bath set at the indicated temperature. The duration of time that each pipe lasted (the average of three) was then recorded.

Example 10

A grade 964 Cr/silica-titania catalyst from W.R. Grace was used to produce polymer resins in a pilot plant reactor as described above in Example 8. The catalyst was activated at 650° C. and reduced in the presence of CO at a temperature of about 370° C. The catalyst was employed with different amounts of the $Cp_2Mg$ cocatalyst in various runs to polymerize ethylene at 94 to 102° C. in the presence of 0.3 to 0.4 mol % $H_2$ based on the isobutane diluent. The ethylene content in the reactor was 10 mol % ethylene based on the isobutane diluent. The resulting polymers and their properties are shown in Table 7.

The polymers produced are useful for blow molding applications. Blow molding evaluations were conducted by blowing a one gallon (105.1 grams) bottle on a UNILOY 2016 single head blow molding machine (sold by Uniloy Milacron Inc.) using a 2.5 inch diameter die, 20 degree diverging die, 32% accumulator position, 8.5 second blow time, 0.10 second blow delay, 0.75 second pre-blow delay and a 45° F. mold temperature. A reciprocating screw speed of 45 rpm was used, providing parison extrusion at shear rates greater than 10,000/sec through the die.

The polymers' ease of processing during blow molding was determined using known measurements. The first measure, listed as "Output" in Table 7, was calculated from the cycle time of the machine and the weight of the bottle and flashing. This measure describes the rate of bottle output in lbs of polymer per hour at which the resin in question was blow molded into bottles during normal operation, and it would describe the commercial rate of bottle production. The second measure was the cycle time, i.e., the time needed to make the bottle and was measured in seconds. Another measure of processing ease is the head pressure, which measures the maximum pressure at the die plate during the extrusion of the bottle. In other words, it is the pressure at the die plate as the bottles are being blown.

The previously discussed weight swell values for the polymers during blow molding were also determined as shown in Table 7. Another measurement of the swell is the die swell or the diameter swell, which is the ratio of the parison diameter to the die diameter. These numbers were referenced to a standard commercial blow molding polyethylene resin known as MARLEX® 5502BN resin, which was obtained from Chevron Phillips Chemical Company.

The onset of melt fracture of each resin was evaluated on the same UNILOY machine by opening the die gap and extruding the resin. The shear rate was increased steadily by increasing the screw rpm. The onset was the rpm at which the parison showed visible signs of melt fracture, such as a shark skin appearance or a distorted surface. This rate was then translated into the shear rate listed in Table 7. A high value indicated that the polymer could be processed at high rates without melt fracture.

Environmental stress crack resistance was also tested using ten 1-gallon bottles made as described above on a UNILOY 2016 machine. The bottles were filled with a 10% Orvus-K detergent solution, capped, and placed in a 140° F. hot room. Bottle failures were noted each day until all had broken, and a 50% mean failure time was calculated for each set.

The bottle toughness of the ten 1-gallon bottles was measured by the Izod impact test (Izod Impact, notched (kJ/m2): ASTM D256(a)-84). A higher number indicated greater toughness. Drop impact tests were also performed to measure bottle toughness by filling the 1-gallon bottles completely full of water and then sealing the bottles by means of a screw cap. These liquid filled bottles were then dropped from a vertical position onto a flat surface from progressively higher levels up to 12 feet high or until the bottle ruptured upon impact. A new bottle was used for each drop.

Based on the results shown in Table 7, various properties of the bottles produced using the $Cp_2Mg$ cocatalyst (the polymers disclosed herein) were found to be superior when compared to the same properties of bottles produced from the standard MARLEX® HHM 5502BN polyethylene resin sold by Chevron Phillips Chemical Company. This resin, which has been sold for 35 years, has become a standard of the industry because of its excellent processing characteristics. However, one can see in Table 7 from the cycle times, output rates, melt fracture shear rates, and head pressure that the polymers disclosed herein processed better. One can also see that the polymers disclosed herein had superior ESCR and impact properties. Their ESCR values were more than ten times greater than those values for the MARLEX® HHM 5502BN resin. The polymers disclosed herein further exhibited a lower swell.

A commercially available resin known as ALATHON® L54400S bimodal resin, which is sold by Equistar Chemicals, LP, was also compared. This bimodal resin is known for its high ESCR. The results in Table 7 below indicate that the polymers produced using the metal Cp cocatalyst also exhibited high ESCR values. In fact, both the ASTM ESCR values and the bottle ESCR of these polymers were quite surprising. The Izod impact and bottle drop properties of the polymers produced using the metal Cp cocatalyst were also very good compared to the control resins.

TABLE 5

| Resin | 1 | 2 | 3 | 4 | 5 | 6 |
|---|---|---|---|---|---|---|
| MgCp$_2$ Added (ppm) | 0.25 | 0.25 | 0.5 | 1.1 | 1.1 | Commercial TR130 |
| Density (g/cc) | 0.937 | 0.936 | 0.937 | 0.938 | 0.934 | 0.937 |
| MI (g/10 min) | 0.31 | 0.33 | 0.28 | 0.29 | 0.16 | 0.28 |

TABLE 5-continued

| Resin | 1 | 2 | 3 | 4 | 5 | 6 |
|---|---|---|---|---|---|---|
| $M_N$ (kg/mol) | 13.97 | 10.05 | 15.67 | 7.1 | 10.14 | 13.8 |
| $M_W$ (kg/mol) | 197.49 | 226.16 | 114.23 | 168.41 | 283.86 | 227.00 |
| $M_W/M_N$ | 14.14 | 22.50 | 7.29 | 23.72 | 28.0 | 16.5 |
| Eta(0) (Pa · s) | 3.08E+05 | 5.13E+05 | 8.65E+05 | 1.36E+06 | 2.95E+06 | 4.56E+05 |
| Tau (s) | 6.75E−01 | 1.34E+00 | 2.40E+00 | 8.07E+00 | 1.45E+01 | 1.34 |
| CY-"a" parameter | 1.75E−01 | 0.1606 | 1.55E−01 | 1.57E−01 | 0.1473 | 0.1729 |
| Dart Impact (g) | 83 | 80 | 90 | 50 | 113 | 81 |
| Spencer Impact (J) | 0.45 | 0.63 | 0.48 | 0.51 | 0.91 | 0.45 |
| MD Tear Resistance (g) | 63 | 100 | 59 | 89 | 70 | 52 |
| TD Tear Resistance (g) | 704 | 712 | 843 | 781 | 918 | 672 |
| Pressure (psig) | 1600 | 1150 | 1150 | 1100 | 1250 | 1200 |
| Motor Load (amp) | 5.7 | 5.1 | 5.1 | 4.1 | 5.6 | 5.9 |

TABLE 6

| Sample | 7 | 8 | 9 | 10 | 11 | 12 | 13 | 14 |
|---|---|---|---|---|---|---|---|---|
| Catalyst | 964, 650° C. CO Reduced | 963, 650° C. CO Reduced | 964, 650° C. CO Reduced | 964, 650° C. CO Reduced | 964, 650° C. CO Reduced | 963, 600° C. | 963, 600° C. | H516 |
| $Cp_2Mg$ added | 0.25 ppm | 1 ppm | 0.5 ppm | 1 ppm | 1 ppm | none | 5 ppm TEB | ZN Bimodal |
| HLMI (g/10 min.) | 6.7 | 5.4 | 6.9 | 10 | 11 | 10 | 8.5 | 8 |
| Density (g/cc) | 0.9503 | 0.9502 | 0.9497 | 0.9490 | 0.9539 | 0.945 | 0.9503 | 0.95 |
| $M_W$ (kg/mol) | 377.05 | 511.37 | 417.88 | 466.25 | 472.18 | 243.3 | 319.6 | 256.5 |
| $M_N$ (kg/mol) | 14.06 | 10.14 | 11.42 | 8.57 | 7.96 | 22.5 | 8.72 | 20.1 |
| PDI | 27 | 50 | 37 | 54 | 59 | 16.8 | 36.7 | 12.8 |
| Eta(0) (Pa · s) | $4.08 \times 10^6$ | $2.62 \times 10^7$ | $5.78 \times 10^6$ | $1.50 \times 10^7$ | $2.49 \times 10^7$ | $1.54 \times 10^6$ | $4.6 \times 10^6$ | $2.74 \times 10^5$ |
| Tau (s) | 26.8 | 48 | 53 | 269 | 537 | 5.2 | 55 | 1.9 |
| CY-"a" parameter | 0.1840 | 0.1965 | 0.1918 | 0.1889 | 0.1815 | 0.1629 | 0.205 | 0.3093 |
| Charpy | | | | | | | | |
| Critical Temp.° C. | −24.2 | −24.3 | −25.3 | −3.0 | −2.4 | −3.4 | −4.4 | −22.0 |
| Total Energy at 23° C. (J/m) | 128 | 144 | 144 | 98 | 86 | 36 | 69 | 129 |
| PENT (h) | 27 (D) | >750 | 84 (D) | >750 | >750 | 13 | 456 | >750 |
| Hoop Stress | | | | | | | | |
| 20° C., 12.4 (Mpa) | | 30, 44, 67 (D) | 35, 66, 92 (D) | 63, 116, 157 (D) | | 1000 | 36 | 65 |
| 80° C., 5.5 (Mpa) | | 25, 137, 163 (D) | 130, 183, 197 (B) | 2, 3, 8 (B) | | 200 | 22 | 932 |

TABLE 7

| Resin ID | | MARLEX HHM 5502BN | ALATHON L54400S | | | |
|---|---|---|---|---|---|---|
| Sample | | 15 | 16 | 17 | 18 | 19 |
| $Cp_2Mg$ | (ppm) | | | 1.1 | 0.5 | 0.5 |
| MI | (g/10 min) | 0.39 | 0.34 | 0.15 | 0.19 | 0.21 |
| HLMI | (g/10 min) | 34.98 | 33.08 | 22.56 | 18.81 | 21.10 |
| HLMI/MI | | 89.7 | 97.3 | 150.4 | 99.0 | 100.5 |
| Density | (g/cc) | 0.9537 | 0.9545 | 0.9530 | 0.9499 | 0.9536 |
| $M_W$ | (kg/mol) | 168.52 | 191.55 | 413.7 | 329.0 | 340.6 |
| $M_Z$ | (kg/mol) | 2143 | 1869 | 8788 | 6748 | 6617 |
| PDI | | 8.042 | 10.475 | 37.148 | 24.745 | 25.730 |
| $E_o$ | (Pa · s) | 621600 | 1486000 | 14280000 | 1566000 | 1365000 |
| $T_g$ | (s) | 1.348 | 2.323 | 151.1 | 5.948 | 5.338 |
| CY-"a" parameter | | 0.1432 | 0.1254 | 0.1348 | 0.1525 | 0.1539 | 0.1667 |
| Notched Izod | (ft-lb/in) | 2.295 P | 1.572 P | 1.609 P | 2.133 P | 2.237 P |
| Tensile Impact | (ft-lb/in$^2$) | 53.4 | 71.9 | 62.0 | 75.3 | 69.0 |
| ESCR A, F50 | (hr) | 34 | 142 | >1000 | >1000 | >1000 |
| ESCR B, F50 | (hr) | 31 | 124 | >1000 | >1000 | >1000 |
| Bottle ESCR, 10% Joy F50 | (hr) | 213 | 165 | >1175 | >1175 | >1175 |
| Bottle Drop Impact | (ft) | >12 | 10.5 | 10.7 | 11.5 | >12 |
| Part Weight | (g) | 168 | 161 | 179 | 157 | 153 |
| Cycle Time | (s) | 11.7 | 11.6 | 15.5 | 11.4 | 11.8 |
| Die Gap | (in) | 0.0159 | 0.0200 | 0.0120 | 0.0154 | 0.0151 |
| Weight Swell | (%) | 450 | 320 | 676 | 433 | 429 |

TABLE 7-continued

| | | | | | | |
|---|---|---|---|---|---|---|
| Diameter Swell | (%) | 33.6 | 32.4 | 39.0 | 36.0 | 41.6 |
| Melt Temperature | (° F.) | 381 | 381 | 381 | 381 | 381 |
| Head Pressure | (psi) | 5160 | 4650 | 5360 | 5730 | 5700 |
| Output | (lb/hr) | 113.9 | 110.1 | 91.6 | 109.2 | 102.8 |
| Shear Rate | (1/s) | 26274 | 15770 | 29298 | 23890 | 25863 |

| Resin ID | | | | | | |
|---|---|---|---|---|---|---|
| | Sample | | 20 | 21 | 22 | 23 |
| | $Cp_2Mg$ | (ppm) | 0.25 | 0.25 | 0.25 | 0.25 |
| | MI | (g/10 min) | 0.20 | 0.31 | 0.31 | 0.31 |
| | HLMI | (g/10 min) | 16.63 | 21.44 | 21.00 | 19.54 |
| | HLMI/MI | | 83.2 | 69.2 | 67.7 | 63.0 |
| | Density | (g/cc) | 0.9535 | 0.9548 | 0.9540 | 0.9541 |
| | $M_W$ | (kg/mol) | 337.7 | 253.0 | 230.4 | 258.2 |
| | $M_Z$ | (kg/mol) | 7112 | 4233 | 2937 | 3783 |
| | PDI | | 21.119 | 14.939 | 13.993 | 15.341 |
| | $E_o$ | (Pa · s) | 717700 | 289400 | 325600 | 419000 |
| | $T_\xi$ | (s) | 2.119 | 0.633 | 0.6893 | 0.9632 |
| | CY-"a" parameter | | 0.1432 | 0.1754 | 0.1714 | 0.1689 0.1432 |
| | Notched Izod | (ft-lb/in) | 2.848 P | 2.775 P | 2.719 P | 2.524 P |
| | Tensile Impact | (ft-lb/in$^2$) | 97.0 | 78.6 | 75.9 | 72.4 |
| | ESCR A, F50 | (hr) | 506 | 183 | 269 | 259 |
| | ESCR B, F50 | (hr) | 722 | 154 | 244 | 310 |
| | Bottle ESCR, 10% Joy F50 | (hr) | 832 | 647 | 991 | 439 |
| | Bottle Drop Impact | (ft) | >12 | >12 | >12 | >12 |
| | Part Weight | (g) | 160 | 164 | 157 | 158 |
| | Cycle Time | (s) | 11.4 | 11.4 | 11.4 | 11.5 |
| | Die Gap | (in) | 0.0174 | 0.0166 | 0.0161 | 0.0166 |
| | Weight Swell | (%) | 378 | 414 | 408 | 396 |
| | Diameter Swell | (%) | 47.7 | 48.5 | 47.7 | 46.7 |
| | Melt Temperature | (° F.) | 381 | 382 | 381 | 381 |
| | Head Pressure | (psi) | 5570 | 5370 | 5440 | 5370 |
| | Output | (lb/hr) | 111.3 | 114.1 | 109.2 | 108.9 |
| | Shear Rate | (1/s) | 20185 | 22308 | 23582 | 22731 |

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A polymer of ethylene and hexene having a HLMI in a range of from about 15 g/10 min to about 50 g/10 min, a density greater than about 0.952 g/cc, an ESCR condition A greater than about 250 hours, and a rheological breadth parameter of from 0.15 to 0.20.

2. The polymer of claim 1, wherein the ESCR condition A is greater than about 500 hours.

3. The polymer of claim 1, wherein the ESCR condition A is greater than about 1000 hours.

4. The polymer of claim 1, wherein the density is greater than about 0.954 g/cc.

5. The polymer of claim 1, wherein the density is greater than about 0.954 g/cc, and the ESCR condition A is greater than about 1,000 hours.

6. The polymer of claim 1 having an ESCR condition B greater than about 500 hours.

7. The polymer of claim 1 having an ESCR condition B greater than about 1000 hours.

8. The polymer of claim 1 having an ESCR condition B greater than about 1,000 hours, wherein the density is greater than about 0.954 g/cc.

9. A polymer of ethylene and hexene having a HLMI in a range of from about 15 g/10 min to about 50 g/10 min, an ESCR condition A greater than about 800 hours, weight swell less than about 700%, and a rheological breadth parameter of from 0.15 to 0.20.

10. The polymer of claim 9, wherein the weight swell is less than about 500%.

11. The polymer of claim 9 having an onset of melt fracture greater than about 24,000/sec.

12. The polymer of claim 10 having an onset of melt fracture greater than about 24,000/sec.

13. The polymer of claim 9, wherein the ESCR condition A is greater than about 1000 hours.

14. The polymer of claim 9 having an onset of melt fracture greater than about 24,000/sec, wherein the weight swell is less than about 500%, and wherein the ESCR condition A is greater than about 1,000 hours.

15. The polymer of claim 14, wherein the polymer has a Charpy impact energy of greater than about 100 J/m.

16. The polymer of claim 9, wherein the weight swell is less than that exhibited by the commercial resin HHM 5502 when molded under control conditions.

17. A polymer of ethylene and hexene having a HLMI in a range of from about 15 g/10 min to about 50 g/10 min, an ESCR condition A greater than about 800 hours, an onset of melt fracture greater than about 26,000/sec, and a rheological breadth parameter of from 0.15 to 0.20.

18. The polymer of claim 17, wherein the onset of melt fracture is greater than about 28,000/sec.

19. The polymer of claim 17, wherein the onset of melt fracture greater is than that exhibited by the commercial resin HHM 5502 when molded under control conditions.

20. A polymer composition having a weight average molecular weight ($M_w$) greater than about 100,000 g/mol, a high load melt index (HLMI) in a range of from about 4 g/10 min to about 15 g/10 min, a critical temperature ($T_c$) of less than about $-15°$ C., a zero shear viscosity ($E_o$) less than about $10^7$ Pa·s, and a rheological breadth parameter of from 0.15 to 0.20.

21. The polymer of claim 1, having rheological breadth parameter of from about 0.16 to about 0.20.

22. The polymer of claim 1, having rheological breadth parameter of from about 0.16 to about 0.19.

* * * * *